United States Patent [19]

Carlson et al.

[11] Patent Number: 5,498,685

[45] Date of Patent: Mar. 12, 1996

[54] CARBOXYLIC-ACID FUNCTIONAL POLYURETHANE POLYMERS AND THEIR USE IN MAGNETIC RECORDING MEDIA

[75] Inventors: James G. Carlson, Lake Elmo; Jack G. Truong, Minneapolis; Jeffrey T. Anderson, Lake Elmo; Nelson T. Rotto, North St. Paul, all of Minn.

[73] Assignee: Minnesota Mining and Manufacturing Company, Saint Paul, Minn.

[21] Appl. No.: 54,511

[22] Filed: Apr. 27, 1993

[51] Int. Cl.⁶ .................................................. C08G 18/34

[52] U.S. Cl. .................. 528/71; 528/73; 528/84; 525/440; 525/454; 525/455

[58] Field of Search ................... 528/71, 73, 84; 525/440, 454, 455

[56] References Cited

U.S. PATENT DOCUMENTS

| | | | |
|---|---|---|---|
| 3,419,510 | 12/1968 | Hudak | 260/18 |
| 3,962,369 | 6/1976 | Chang et al. | 525/518 |
| 4,731,292 | 3/1988 | Sasaki et al. | 428/425.9 |
| 4,784,907 | 11/1988 | Matsufuji et al. | 428/328 |
| 4,784,914 | 11/1988 | Matsufuji | 428/418 |
| 4,788,103 | 11/1988 | Okita | 428/425.9 |
| 4,826,921 | 5/1989 | Andrews | 525/454 |
| 4,837,082 | 6/1989 | Harrell et al. | 428/329 |
| 4,861,683 | 8/1989 | Nakachi et al. | 428/694 |
| 4,985,314 | 1/1991 | Morrison et al. | 428/694 |
| 4,997,906 | 3/1991 | Thaler | 525/454 |
| 5,122,552 | 6/1992 | Johnson | 523/454 |

*Primary Examiner*—James J. Seidleck
*Assistant Examiner*—R. F. Johnson
*Attorney, Agent, or Firm*—Gary L. Griswold; Walter N. Kirn; Janice L. Dowdall

[57] ABSTRACT

The invention provides novel polyurethanes which can be used in magnetic media binders applications. The polyurethanes comprise multidentate chelating functional groups pendant from the polymer backbone, which groups are produced by esterification of backbone hydroxyl moieties with cyclic dicarboxylic acid anhydrides which also bear an additional polar functional group such as those selected from the group consisting of —H, —OH, —COOM, —SO₃M, —SH, —CH₂COOM, —SCH₂COOM, —P(=O)(OM)₂, —OP(=O)(OM)₂, and the like. Examples of anhydrides useful in preparation of the polyurethanes include anhydrides of citric acid, mercaptosuccinic acid, dimercaptosuccinic acid and nitrilotriacetic acid. The polyurethanes, which are optionally radiation curable, show high affinity for magnetic pigments, and blends of the polyurethanes with vinyl resins afford excellent binders for magnetic recording media.

12 Claims, 2 Drawing Sheets

CARBOXYLIC-ACID FUNCTIONAL POLYURETHANE POLYMERS AND THEIR USE IN MAGNETIC RECORDING MEDIA

FIELD OF THE INVENTION

This invention relates to polyurethane polymers having multidentate chelating functional groups comprising a carboxylic acid group and at least one additional polar functional group adjacent thereto pendant from the polyurethane polymer backbone. The invention also relates to the use of such polymers and their blends in magnetic recording media.

BACKGROUND OF THE INVENTION

Magnetic recording media generally include a binder dispersion layer comprising a binder and a pigment overlying a substrate, wherein the pigment is dispersed within the binder. Typically, the pigment is a magnetizable pigment comprising small, magnetizable particles. In some instances, the medium may be in the form of a composite having both back-coat and front-coat binder dispersion layers, although the pigment in the back-coat may or may not be a magnetizable pigment.

It has become desirable to have as high a loading of magnetizable pigment in the magnetic recording media as is reasonably possible. It is often preferred to have a binder dispersion comprising from about 70% to 85% by weight magnetizable pigment relative to the binder with as many magnetizable particles per unit area or unit volume as possible. It is also preferred to have a binder dispersion in which the magnetizable pigment comprises a plurality of small particles having a relatively high specific surface area. Higher pigment loading has the potential to provide high density magnetic recording media capable of storing more information.

Problems, however, remain in the art concerning magnetic recording media having a relatively high loading of magnetizable pigment. To begin with, magnetizable pigments tend to agglomerate, and they are difficult to properly and fully disperse within the binder. Wetting agents, or dispersants, are often employed to facilitate such dispersion. For higher pigment loading, i.e., the use of greater amounts by weight and number of magnetizable particles, greater amounts of such dispersants are required, which is not always desirable.

There are a number of reasons for using as little dispersant as possible. Dispersants tend to soften binder systems, decrease their toughness, and adversely affect their cure. Binders without dispersants can be more readily and reproducibly prepared. Further, excess dispersant may bloom from a cured binder system over time, leading to contamination of a recording head or the like, causing a change in the physical or chemical characteristics of the media.

To help alleviate these problems with added dispersants, binder compositions having internal (chemically bound) dispersants have been developed. Such compositions comprise polymers with functional moieties pendant from the polymer backbone that help disperse the magnetizable pigment. As a result of using these compositions, less dispersant or, in some instances, no dispersant is needed for dispersion of magnetic pigment in the binder. However, in spite of these improvements, a higher degree of pigment-polymer interaction is desired, particularly in the case of pigments exhibiting small particle size, such as barium ferrite.

Recently, sulfonated hydroxy-functional polyurethane-containing binder systems have been described which exhibit excellent pigment loading and magnetic orientation (U.S. Pat. Nos. 5,071,578 and 5,085,941, both assigned to 3M, both incorporated by reference herein). However, these sulfonated polyurethane binder systems are less effective in dispersing barium ferrite (BaFe) pigments, a class of pigments of increasingly important commercial consideration.

Polyurethane magnetic binder polymers containing isolated carboxylic acid groups which do not have additional polar functional groups associated therewith (i.e., are not capable of chelation) are known in the art. "Chelating agents" (materials capable of chelation) refers to materials which have two or more atoms which may serve as electronegative donors positioned so that the donor atoms may react with a metal atom, metal ion, or metal surface to form a five-membered or six-membered ring structure. Donor atoms are selected from oxygen, nitrogen and sulfur. Donor groups include alcohols, enols, phenols, ethers, carboxylic acids and carbonyl groups such as aldehydes, ketones, carboxylic esters and carboxamides, and their thio-analogs. Nitrogen-containing donor groups include imines and amines and moieties in which the nitrogen atom forms part of a heterocyclic ring. Such materials with two or more donor groups are also known in the art as "bidentate," "polydentate," or "multidentate," and these terms, when used herein, are used interchangeably.

U.S. Pat. No. 4,612,244 (to Sony Corp.) discloses the potential use of a metal salt of hydroxyacetic acid as a component of a polyurethane binder for a backside coating of magnetic recording tape. U.S. Pat. No. 4,613,345 (to Sony Corp.) discloses the possible use of chloroacetic acid to produce carboxyl-functional magnetic binders. U.S. Pat. No. 4,571,364 (to Fuji Photo Film Co.) discloses polyurethane resins for magnetic binders in which lysine (or its salts) or 2-alkyl-2-carboxy-1,3-propanediols are incorporated into the polymer. None of these discloses or claims the use of multidentate carboxyl-functional polyurethanes. U.S. Pat. No. 4,788,103 (to Fuji Photo Film Co.) describes a magnetic pigment binder comprising a polyurethane containing a polar group such as a carboxylic acid or a carboxylic acid salt. Barium ferrite particles are among those disclosed, but not claimed, as compatible with the binder resin.

A carboxyl-functional polyurethane resin for magnetic media is commercially available from Sanyo Chemical Industries under the trade name TI7503. Japanese Patent Applications JP 03 64,310 and JP 03 64,314, both to Sanyo, describe a urethane binder prepared by using, inter alia, dimethylolpropionic acid or its ammonium salt. The binders disclosed in the two Sanyo applications have only isolated carboxylic acid groups.

U.S. Pat. No. 4,096,127, to Akzona, discloses preparation of carboxyl-functional polyurethanes by half-esterification of hydroxy groups pendant from the polyurethane backbone with aliphatic or aromatic dicarboxylic acid anhydrides. Acid anhydrides of the invention have no additional functionality, and the resultant ester-acids are converted to salts and used as paper sizing agents. No applications towards magnetic media are taught.

Hydroxylated polycarboxylic acids of low molecular weight, such as citric acid, tartaric acid or 1-malic acid have been used as non-chemically-bonded additives in magnetic media articles. U.S. Pat. No. 4,693,930, to 3M, discloses the use of citric acid as a lubricant-adsorption inhibitor. Similarly, U.S. Pat. No. 5,066,539, to Sony Corporation, discloses the use of citric acid and nitrilotriacetic acid as non-reactive additives to magnetic media preparations.

Chelating agents which are included in polymer systems are also described in U.S. Pat. No. 5,026,860, assigned to the assignee of the present invention, which is incorporated by reference herein. Ethylenically-unsaturated copolymerizable chelating monomers are described. Non-copolymerizable arthydrides are not described.

Blends of polyurethanes with vinyl chloride resins are known in the magnetic pigment binder patent art. Vinyl chloride resins containing polar functionality, especially sulfonate or ammonium salts, are capable of producing good dispersions by themselves, but these resins generally lack sufficient toughness and flexibility for most product applications. Blending of these vinyl chloride resins with polyurethane resins improves toughness of the resulting binder but care must be taken to preserve dispersion quality. Commercially available carboxyl-functional polyurethanes are compatible with ammonium vinyl chloride resins but the known carboxyl-functional polyurethanes interact weakly with pigments and produce relatively poor dispersions by themselves and, in general, they degrade the dispersing capability of ammonium vinyl chloride resins when blended therewith.

A need thus exists for a polyurethane binder composition which is capable of irreversible binding of pigment particles and which produces smooth, high loading barium ferrite dispersions which provide pigment coatings with low void volume and excellent magnetic and mechanical properties, and which are compatible with, e.g., ammonium vinyl chloride resins.

SUMMARY OF THE INVENTION

We have discovered such a polyurethane binder, magnetic media produced therefrom, blends of the polyurethane with vinyl chloride resins, and magnetic media produced therefrom.

Magnetic binders of this invention comprise polyurethane polymers having pendant carboxylic acid groups prepared by the esterification reaction of a cyclic dicarboxylic acid anhydride moiety containing, at least one, typically 1 to 2, preferably 1 additional polar group(s) in addition to the two polar —COOH groups contained therein, such as those selected from the group consisting of —OH, —SH, —SO$_3$H, and —COOH, with a hydroxyl group directly attached to the polyurethane backbone. Specific examples of the cyclic dicarboxylic acid anhydride moieties include but are not limited to those selected from the group consisting of cyclic anhydrides of acids selected from the group consisting of citric acid, mercaptosuccinic acid, dimercaptosuccinic acid, nitrilotriacetic acid, sulfosuccinic acid, derivatives thereof, and mixtures thereof. These anhydrides may be generated in situ by reaction of the corresponding dicarboxylic acid with isocyanate present in the polyurethane reaction mixture. Blends of the resulting polyurethanes with vinyl chloride resins such as ammonium vinyl chloride afford superior dispersions and coatings of magnetic pigments, especially heretofore difficult pigments such as barium ferrite. Without wishing to be bound by theory, we speculate that the superior dispersions and coatings are a result of irreversible adsorption of the pigment by the polyurethane of the present invention (chelation), leading to a stable adsorbed layer and a very strong pigment-polymer bond.

One aspect of the invention relates to a novel carboxylic acid functional polyurethane polymer comprising the reaction product of:

(a) one or more polyisocyanates;

(b) one or more polyols;

(c) one or more compounds selected from the group consisting of cyclic dicarboxylic acid anhydrides, bearing at least one additional polar group in addition to its polar anhydride group; dicarboxylic acids bearing at least one additional polar group, in addition to its two polar carboxyl groups, which dicarboxylic acids are capable of forming cyclic anhydrides; and mixtures thereof.

For magnetic media purposes, the ratio of polyisocyanate to polyol is typically such that the resulting polyurethane is soluble in solvents (i.e., not crosslinked or gelled) and contains excess hydroxyl functionality (i.e., all isocyanate groups are reacted—the ratio of —NCO groups to —OH groups is less than about 1:1).

Another aspect of the invention relates to a novel curable binder composition comprising:

a blend of:

(a) a vinyl chloride copolymer resin; and (b) the carboxylic acid functional polyurethane polymer described above.

Another aspect of the invention relates to a dispersion comprising:

(a) the carboxylic acid functional polyurethane polymer as described above; and (b) a magnetic pigment dispersed in the polymer.

Another aspect of the invention relates to the above dispersion which further comprises a vinyl chloride resin.

Another aspect of the invention relates to a composite for magnetic recording comprising:

(a) a substrate having a front side and a back side;

(b) a dispersion coating on at least one side comprising the carboxylic acid functional polyurethane polymer as described above; and (c) a magnetizable pigment and optionally a nonmagnetizable pigment dispersed in the dispersion on at least one side.

Another aspect of the invention relates to a magnetic recording medium having a magnetizable layer of pigment particles which are dispersed in a binder, wherein the binder comprises a cured composition as described above.

Another aspect of the invention relates to a novel method of producing the carboxylic acid functional polyurethane polymer comprising the steps of:

(a) forming a reaction product comprising a polyurethane prepolymer having a pendant isocyanate group(s) by reacting a molar excess of a polyisocyanate with one or more diols;

(b) forming a cyclic anhydride by reacting a dicarboxylic acid selected from the group consisting of 1,4-dicarboxylic acid bearing at least one polar group in addition to its two carboxylic acid groups, 1,5-dicarboxylic acid bearing at least one polar group in addition to its two carboxylic acid groups, and mixtures thereof with the reaction product of step (a) wherein the amount of polar group-containing dicarboxylic acid used is such that the ratio of moles of polar group-containing dicarboxylic acid to the moles of residual isocyanate groups in the reaction product of step (a) is less than about 0.25 to 1;

(c) forming a hydroxyl functional polyurethane polymer by converting the residual isocyanate groups of the prepolymer of step (a) which remain unreacted in step (b) to polyurethane via reaction with an excess of a polyol wherein the number of moles of hydroxyl groups contained therein is greater than the difference between the number of moles of residual isocyanate groups in the prepolymer of step (a) and the number of moles of polar group-containing dicarboxylic acid of step (b) and (d) allowing the reaction of the cyclic anhydride formed in step (b) with the hydroxyl functional polyurethane polymer thereby esterifying the hydroxyl groups with the cyclic anhydride and producing pendant polar-group functional carboxyl substituents on a polyurethane backbone.

DETAILED DESCRIPTION OF THE INVENTION

The present invention comprises novel carboxyl-functional polyurethane polymers, magnetic media made therefrom, a method of making the polyurethane polymers, a blend of the polyurethane polymers with vinyl chloride copolymer resins, and magnetic media made from the blends.

I. Method of Preparing Carboxylic Acid Functional Polyurethane Polymers

The general method of preparing the polymers of the present invention comprises the reaction of a polar-group functional cyclic anhydride with hydroxyl groups pendant from the backbone of a polyurethane, the polyurethane being produced from the condensation reaction of polyisocyanate(s) with one or more polyols, as defined in Section II, below. The polymer may be prepared in the presence or absence of a solvent. Preferably, the polymerization is carried out in the presence of an organic solvent selected from the group consisting of cyclohexanone, toluene, methyl ethyl ketone, tetrahydrofuran, and mixtures thereof. Most preferably, the solvent is selected from the group consisting of methyl ethyl ketone and tetrahydrofuran.

A catalyst may be added to promote the reaction, e.g., a tin catalyst such as dibutyltin dilaurate. The component polyol(s) and polyisocyanate(s) may be introduced into the reaction medium individually in stepwise fashion in order to decrease the random nature of the copolymer. Alternatively, all of the constituent ingredients may be added to the reaction medium prior to initiating the reaction, in a batch polymerization process, which produces an essentially random copolymeric polyurethane. The order of addition of ingredients may have an effect on the viscosity of the resultant polyurethane, and a skilled practitioner would be able to determine which order will produce a desired viscosity.

We have discovered a surprisingly facile synthesis of polyurethanes containing multidentate complexing moieties. Reaction mechanisms and rates are such that these polyurethanes can be readily prepared by introducing the appropriate polar group-containing 1,4-dicarboxylic acid and/or 1,5-dicarboxylic acid into a polyurethane synthesis reaction where diisocyanates are undergoing reaction with polyols. The diacid is rapidly converted to cyclic anhydride by reaction with some of the isocyanate. If a suitable excess of polyol hydroxyl functionality is present, the anhydride and the remaining isocyanate react with available hydroxyl and the product is a polyurethane containing pendant hydroxyl groups, some or all of which are esterified with the polar group containing diacid. Little or no crosslinking takes place and the product is soluble.

This synthesis succeeds because the reaction of 1,4-dicarboxylic acids or 1,5-dicarboxylic acids with isocyanates proceeds very rapidly to form cyclic anhydride as the major product. Simple versions of this reaction are known in the literature (see *Kirk-Othmer Encyclopedia of Chemical Technology*, Third Edition, John Wiley, New York, Vol. 13, p. 793, incorporated by reference herein), but we have found that it also occurs readily even when a polar, anhydride reactive group is present in the aliacid molecule. This allows us to generate in situ novel anhydrides which would be unstable (self-reactive) if isolated in a concentrated form. These anhydrides can then be used to generate novel pendant groups from polyurethanes via reaction with hydroxyl. Infrared spectra were used to verify the major course and products of the reaction, where anhydride can be clearly seen to be formed initially and then reacted. It is probable that some of the 1,4-dicarboxylic acid or 1,5-dicarboxylic acid reacts with isocyanate by the more usual route to form amide instead of anhyride. This is a slow reaction at the temperatures involved but it also results ultimately in a polyurethane containing pendant polar group with similar multidentate functionality.

Typically, a reaction mixture of one or more diols, dibutyltin dilaurate catalyst, solvent and an excess of a suitable diisocyanate is heated at about 60° C. to about 80° C. with stirring and allowed to react under anhydrous conditions. Next, the polar-group containing 1,4-dicarboxylic acid or 1,5-dicarboxylic acid or its cyclic anhydride is added and heating continues. Finally, a triol is added, heat is again applied, and, when infrared analysis shows that no isocyanate and no anhydride remain, the desired carboxyl-functional polyurethane is obtained.

II(a). Polyol

The term "polyol" as used herein refers to polyhydric alcohols containing two or more hydroxyl groups and includes diols, triols, tetrols, etc.

II(a)(i). Triols

A preferred class of triols comprises polycaprolactone triols. One particularly useful triol is a polycaprolactone triol having a hydroxy equivalent weight of about 180 and a number average molecular weight of approximately 540, available under the trade designation TONE™ 0305 from Union Carbide Company. Other useful triols include polycaprolactone triols other than TONE™ 0305, such as TONE™ 0301 and TONE™ 0310, both available from Union Carbide, polyester triols such as butylene adipate triols, polyether triols such as the poly(propylene oxide) adduct of trimethylol propane known as LHT-240™, from Union Carbide, and simple triols such as trimethylolpropane and glycerol. Tetrafuctional or higher alcohols such as pentaerythritol may also be useful. Preferably the hydroxy groups in the triol are primary in order to facilitate curing of the resultant polymer with a curing agent. It is also foreseen that mixtures of various triols may be utilized.

II(a)(ii). Diols

A variety of diols may be utilized according to the invention including both short chain and long chain diols. Also, mixtures of diols can be used. A preferred class of diols are oligomeric diols defined as diols having a hydroxy equivalent weight greater than about 200 (g/eq). Most preferred are the polycaprolactone diols and polycarbonate diols having a hydroxy equivalent weight of from about 200 to 2,000 (g/eq). Such materials include polyester diols such as TONE™ 0210, available from Union Carbide Company, having a hydroxy equivalent weight of about 415. Another such material is DURACARB™ 120, a polycarbonate diol from PPG Industries Inc. having a number average molecular weight of about 900 (hexanediol carbonate).

Other useful diols include polyether diols such as polytetramethylene glycols and polypropylene glycols; and polyester diols, such as a polyester diol that is the reaction product of a mixture of adipic and isophthalic acids and hexane diol. Preferably, at least some low molecular weight (less than about 200 number average molecular weight) diols are used to provide preferred hardness characteristics to the polymer and the magnetic media prepared therefrom. Examples of these are ethylene glycol; propylene glycol; 1,3-propane diol; 1,4-butane diol; 1,5-pentane diol; 1,6-hexane diol; neopentyl glycol; diethylene glycol; dipropylene glycol; 2,2,4-trimethyl-1,3-pentane diol; cyclohexane dimethanol; 1,4-cyclohexanedimethanol; ethylene oxide and/or propylene oxide adduct of bisphenol A; and ethylene oxide and/or propylene oxide adduct of hydrogenated bisphenol A. Examples of other diols which may be useful include macromonomer diols, diols having polar functional groups, diols bearing ethylenic unsaturation, such as 3-allyloxy-1,2-propanediol, 1-glyceryl (meth)acrylate, 2-glyceryl (meth)acrylate, 2-methylene-1,3-propane diol, pentaerythritol di(meth)acrylate, trimethylolpropane monoallyl ether, 2-acrylamido-2-hydroxyethyl-1,3-propanediol, N,N-diallyltartardiamide and N-allyl-2,2'-iminodiethanol, and fluorinated diols such as $C_8F_{17}SO_2N[(CH_2)_2OH]_2$. Fluorinated diols can be used in an amount such that the fluorinated diol comprises about 0.1 to about 20 weight percent of the polymer of the invention. It is further noted that for any of the reactants mentioned, mixtures of materials can be utilized.

II(b). Polyisocyanates

A wide variety of polyisocyanates may be utilized according to the present invention. "Polyisocyanates" means any organic compound that has two or more reactive isocyanate (i.e., —NCO ) groups in a single molecule that can be aliphatic, alicyclic, aromatic or a combination thereof. This definition includes diisocyanates, triisocyanates, tetraisocyantes, etc., and mixtures thereof. Preferably, diisocyanates are used. Useful diisocyanates include but are not limited to those selected from the group consisting of diphenylmethane diisocyanate, isophorone diisocyanate, toluene diisocyanate, hexamethylene diisocyanate, tetramethylxylene diisocyanate, and p-phenylene diisocyanate. It is noted that mixtures of diisocyanates can also be used.

II(c). Hydroxy Groups

For magnetic binder applications, the polymer of the invention preferably possesses hydroxy functionality. It is most preferred but not required that there be on the average more than about 2 hydroxy groups per polymer available for crosslinking purposes. Polymers intended for magnetic binder use preferably have a cross-linkable hydroxy group equivalent weight of from about 500 to about 50,000, most preferably from about 1,000 to about 5,000 (g/eq).

II(d). Polar-Group Substituted Dicarboxylic Acid Anhydrides

Polar-group containing substituted cyclic dicarboxylic acid anhydrides useful in the invention are represented by formula I wherein $R^1$, $R^2$, $R^3$, and $R^4$, are independently selected from the group consisting of —H, —OH, —COOM, —SO$_3$M, —SH, —CH$_2$COOM, —SCH$_2$COOM, —P(=O)(OM)$_2$, —OP(=O)(OM)$_2$, and —Y, wherein at least one of $R^1$, $R^2$, $R^3$, and $R^4$ comprises a moiety other than —H or —Y;

Y is selected from the group consisting of linear alkyl groups comprising from about 1 to about 10 carbon atoms, branched alkyl groups comprising from about 1 to about 10 carbon atoms, and aryl groups comprising from about 6 to about 10 carbon atoms;

M is a cation selected from the group consisting of alkali metal cations, H$^+$ and ammonium cations;

$R^1$ and $R^2$ together or $R^3$ and $R^4$ together can optionally be =CHCOOH;

X is a divalent moiety independently selected from the group consisting of n represents an integer selected from the group consisting of 0 and 1;

$R^5$ and $R^6$ are independently selected from the group consisting of —H, —OH, —COOM, —SO$_3$M, —SH, —CH$_2$COOM, —SCH$_2$COOM, —P(=O)(OM)$_2$ —OP(=O)(OM)$_2$, and —Y, wherein M and Y are as defined above;

$R^7$ is a monovalent moiety independently selected from the group consisting of—CH$_2$COOH, —CH$_2$CH$_2$COOH, —CH$_2$CH$_2$N(CH$_2$COOH)$_2$, —(CH$_2$)$_6$N(CH$_2$COOH)$_2$, —(CH$_2$CH$_2$O)$_2$CH$_2$CH$_2$N(CH$_2$COOH)$_2$, and —CH$_2$CH$_2$N(CH$_2$COOH)CH$_2$CH$_2$OH.

Preferably, $R^1$, $R^2$, $R^3$, $R^4$, $R^5$, and $R^6$ are independently selected from the group consisting of—H, —OH, —COOM, —SO$_3$M, —SH, —CH$_2$COOM, —SCH$_2$COOM, and —Y, wherein M and Y are as previously defined.

Preferred polar-group containing substituted cyclic dicarboxylic acid anhydrides useful in the invention include those selected from the group consisting of substituted derivatives of 1,4-butanedicarboxylic acid anhydride [formula I(a)] and substituted derivatives of nitrilodiacetic acid anhydride [formula I(b)]:

I(a)

I(b)

and mixtures thereof,
wherein for formula I(a) one of the following is true:

(i) $R^1$ is selected from the group consisting of —OH, —COOH, —SO$_3$H, —SH, —CH$_2$COOH, —SCH$_2$COOH, —CH(COOH)CH$_2$COOH, and —CHOHCH$_2$COOH and $R^2=R^3=R^4=$—H;

(ii) $R^1=R^3=$—SH and $R^2=R^4=$—H;

(iii) $R^1=$—CH$_2$COOH, $R^2=$is selected from the group consisting of —CH$_3$, and —OH, and $R^3=R^4=$—H;

(iv) $R^1$ and $R^2$ together comprise=CHCOOH and $R^3=R^4=$—H;

(v) $R^3$ and $R^4$ together comprise=CHCOOH and $R^1=R^2=$—H; and wherein for formula I(b) the following is true: $R^5$ is selected from the group consisting of —CH$_2$COOH, —CH$_2$CH$_2$COOH, —CH$_2$CH$_2$N(CH$_2$COOH)$_2$, —(CH$_2$)$_6$N(CH$_2$COOH)$_2$, —(CH$_2$CH$_2$O)$_2$CH$_2$CH$_2$N(CH$_2$COOH)$_2$, and —CH$_2$CH$_2$N(CH$_2$COOH)CH$_2$CH$_2$OH. The anhydrides of formula I(a) are most preferred according to the present invention.

Preferably, the cyclic dicarboxylic acid anhydride is selected from the group consisting of the cyclic anhydrides of acids selected from the group consisting of citric acid, mercaptosuccinic acid, dimercaptosuccinic acid, and nitrilotriacetic acid. Most preferably, the cyclic dicarboxylic acid anhydride is selected from the group consisting of citric acid anhydride and mercaptosuccinic acid anhydride.

The cyclic dicarboxylic acid anhydrides of the present invention can be reacted directly or can be generated in situ from their respective aliphatic dicarboxylic acids. Dicarboxylic acids of the present invention are distinguished structurally by the presence of two carboxylic acid groups within 4 or 5 atoms of each other along their backbone. Such dicarboxylic acids are known in the art to form cyclic anhydrides easily under dehydrating conditions, whereby the resulting cyclic anhydride is a five-membered ring or a six-membered ring, respectively. In the dicarboxylic acids herein described, cyclic anhydride formation is the preferred reaction path, as shown in scheme (A), in which citric acid is the polar group functional dicarboxylic acid and RNCO is any available isocyanate moiety.

(A)

The cyclic anhydride thus formed reacts with any available hydroxy groups pendant from the polyurethane polymer backbone via an esterification reaction as shown in scheme (B).

Once the cyclic anhydride is formed, it is essentially unreactive toward self-condensation with polar groups present on anhydride molecules in the reaction mixture, for two reasons. First, these polar groups are relatively hindered, especially relative to the hydroxyls of the polyurethane backbone.

(B)

Second, because of dilution effects, there are relatively few anhydride-based polar groups with which the anhydride can react, again, especially relative to the large number of pendant hydroxyls on the polyurethane backbone.

Because of the additional requirement that the dicarboxylic acid or anhydride (or both) is substituted with an additional polar group such as those selected from the group consisting of —OH, —SH, —COOH, and —SO$_3$H, the resulting pendant half-ester has, at its terminal ends, both a carboxylic acid group and the additional polar group. The structure of the pendant groups, as defined herein, is ideally suited for facile complexation with or chelation of metallic species. Thus, metallic materials used as magnetic pigments can readily be bound to the polyurethane polymer, providing excellent stabilization of the pigments and excellent dispersions thereof.

The polymer of the invention preferably has pendant from it at least one group of formula II,

II wherein $R^1$, $R^2$, $R^3$, and $R^4$, are independently selected from the group consisting of —H, —OH, —COOM, —SO$_3$M, —SH, —CH$_2$COOM, —SCH$_2$COOM, —P(=O)(OM)$_2$, —OP(=O)(OM)$_2$, and —Y, wherein at least one of $R^1$, $R^2$, $R^3$, and $R^4$ comprises a moiety other than —H or —Y;

Y is selected from the group consisting of linear alkyl groups comprising from about 1 to about 10 carbon atoms, branched alkyl groups comprising from about 1 to about 10 carbon atoms, and aryl groups comprising from about 6 to about 10 carbon atoms;

M is a cation selected from the group consisting of alkali metal cations, H$^+$ and ammonium cations;

$R^1$ and $R^2$ together or $R^3$ and $R^4$ together can optionally comprise =CHCOOH;

X is a rivalent moiety independently selected from the group consisting of n represents an integer selected from the group consisting of 0 and 1;

$R^5$ and $R^6$ are independently selected from the group consisting of —H, —OH, —COOM, —SO$_3$M, —SH, —CH$_2$COOM, —SCH$_2$COOM, —P(=O)(OM)$_2$ —OP(=O)(OM)$_2$, and —Y, wherein M and Y are as defined above; and $R^7$ is a monovalent moiety independently selected from the group consisting of —CH$_2$COOH, —CH$_2$CH$_2$COOH, —CH$_2$CH$_2$N(CH$_2$COOH)$_2$, —(CH$_2$)$_6$N(CH$_2$COOH)$_2$, —(CH$_2$CH$_2$O)$_2$CH$_2$CH$_2$N(CH$_2$COOH)$_2$, and —CH$_2$CH$_2$N(CH$_2$COOH)CH$_2$CH$_2$OH.

Preferably, $R^1$, $R^2$, $R^3$, $R^4$, $R^5$, and $R^6$ are independently selected from the group consisting of —H, —OH, —COOM, —SO$_3$M, —SH, —CH$_2$COOM, —SCH$_2$COOM, and —Y, wherein M and Y are as defined above.

II(e). Pendant Ethylenically-Unsaturated Groups

Optionally, ethylenically-unsaturated groups which are crosslinkable when subjected to ionizing radiation may be pendant from the polyurethane backbone. Such pendant ethylenically-unsaturated groups are produced by chemical reaction of at least one unsaturated compound which further contains a functional group which is reactive with one or more hydroxyl groups pendant from the polyurethane backbone, as described in section II(c). Useful hydroxyl-reactive functional groups include, for instance, isocyanate, acid chloride, and anhydride. Useful functional-group containing unsaturated compounds include but are not limited to those selected from the group consisting of isocyanatoethyl methacrylate, allyl isocyanate, alpha, alpha-dimethyl-m-isopropenyl benzylisocyanate, (meth)acryloyl chloride, itaconic anhydride, toluene diisocyanate-hydroxyalkyl (meth)acrylate adducts, and mixtures thereof. The backbone may have one or more pendant groups, typically a plurality of pendant groups. Blends of polyurethanes of the invention having pendant radiation curable methacrylate group(s) with polyurethanes having radiation curable allyl moieties are particularly useful. Typically a ratio of about 40:60 to 60:40 is used, preferably about 45:55 to 55:45, most preferably about 50:50.

We have found, surprisingly, that magnetic pigments that have heretofore been difficult to disperse in magnetic binders known in the art are readily and thoroughly dispersed in binders comprising the polyurethanes having pendant carboxylic acid groups and pendant polar groups of the present invention. More particularly, the binders of the present invention produce smooth, high loading magnetic pigment dispersions which provide coatings having low void volume and excellent magnetic and mechanical properties. The data in FIGS. 1 and 2 support the strongly absorbing nature of the pigment-polyurethane interaction described in the present invention. The pigment-polyurethane interaction appears to be essentially irreversible.

III. Vinyl Chloride Copolymer

The carboxyl-functional polyurethane polymers of the invention are compatible with a wide range of vinyl chloride copolymers with which they can be optionally blended. The blends can comprise up to about 95 percent by weight of a curable hydroxy functional vinyl chloride copolymer. A curable binder composition blend can be prepared by combining the carboxylic acid functional polymer of the invention with a vinyl chloride copolymer. The blends have a number of advantages, including the following: Such blends afford a good combination of mechanical properties, particularly hardness and toughness, and superior adsorption onto the surface of magnetic pigments at low polymer concentrations, that is superior to either polymer alone. These properties are due to the sufficient miscibility of the carboxylic acid functional polyurethane polymer of the invention and the vinyl chloride copolymer. The polymer of the invention provides a strong interface with and adhesion to magnetic pigments which leads to improved wear properties of the finished coatings. This combination of good mechanical properties and excellent irreversible bonding to the pigments is not obtained with polyurethane-vinyl copolymer blends known in the art. The curable binder composition of the present invention typically comprises from about 5 percent to about 95 percent by weight of a curable hydroxy functional vinyl chloride copolymer, if used, for good balance of properties, preferably about 25 to about 75 weight percent for superior balance of properties, and most preferably about 45 to about 55 weight percent for even better balance of properties based upon the total weight of the curable binder composition. Preferred vinyl chloride copolymers contain pendant hydroxyl groups to promote solubility, cure and compatibility with other resins. Preferred vinyl chloride copolymers also contain pendant polar groups to aid in the dispersing of pigments, and optionally, epoxy groups to improve heat stability. Other pendant groups may optionally be present to impart desired thermal or mechanical properties.

The vinyl chloride copolymer can be prepared by various polymerization methods, such as emulsion polymerization, solution polymerization, suspension polymerization, and bulk polymerization. In any of such polymerization methods, incremental or continuous addition of a molecular weight control agent, a polymerization initiator, and the monomers for copolymerization may be used when necessary. Preferably the vinyl chloride monomer is present in sufficient amount such that the vinyl chloride copolymer has a vinyl chloride monomer content of at least 60% by weight for reasons of solubility and polymer blend compatibility.

In order to provide vinyl chloride copolymer having a plurality of hydroxyl groups pendant from the polymer backbone, monomers containing free hydroxyl groups are copolymerized into the vinyl chloride copolymer. These monomers should be present in a sufficient amount such that the vinyl chloride copolymer has an hydroxyl equivalent weight of about 500 to about 10,000. Examples of suitable monomers having pendant hydroxyl groups include, for example an alkanol ester of an α,β-unsaturated acid such as 2-hydroxylethyl acrylate or methacrylate, hydroxypropyl acrylate or methacrylate, an olefin type alcohol such as 3-butene-1-ol, 5-hexene-1-ol, an alkanol vinyl ether such as 2-hydroxyethyl vinyl ether, an acrylamide such as N-methlolacrylamide, N-methylolmethacrylamide, and the like. Alternatively, vinyl acetate units can be copolymerized then partially or fully hydrolyzed to produce vinyl alcohol units.

The vinyl chloride copolymer preferably contains monomer units having pendant epoxy groups in order to retard dehydrochlorination and thereby improve polymer stability. Examples of suitable monomers include those selected from the group consisting of a glycidyl ether of an unsaturated alcohol such as allyl glycidyl ether, a glycidyl ester such as glycidyl acrylate or methacrylate, an epoxidized olefin such as butadiene monoxide, vinylcyclohexene monoxide, and the like. The epoxy monomer may be used in an amount such that the vinyl chloride copolymer has an epoxy equivalent weight of from about 500 to about 30,000, preferably from about 1,000 to about 20,000, for reasons of maximum effectivity.

It is preferable but not essential that the vinyl chloride copolymer contain polar groups to aid in pigment wetting and dispersion. Preferred polar groups include those selected from the group consisting of $-SO_3M$, $-NR_3X$, $-NR_2$, $-OSO_3M$, $-COOM$, $-OPO_3M$, and $-PO_3M$ where M is a cation selected from the group consisting of alkali metal cations (e.g. $Na^+$ or $K^+$ etc.), $H^+$, and ammonium cations, R is selected from the group consisting of alkyl comprising 1 to about 30 carbon atoms, aryl, and aralkyl groups, and X is an anion selected from the group consisting of the halogens, sulfates, and sulfonates.

The polar groups can be introduced into the vinyl chloride copolymer either through the use of polar initiators, polar monomers, or by polymer reactions. Whatever method is used, it is desirable that the polar groups be present in an amount sufficient to provide a vinyl chloride copolymer having a polar group equivalent weight of from about 2,000 to about 100,000 grams polymer per mole of polar group, preferably from about 5,000 to about 30,000 grams per mole of polar group for reasons of dispersion rheology.

Examples of polar initiators include but are not limited to those selected from the group consisting of 4,4'-azobis(4-cyanovaleric acid), succinic acid peroxide, potassium persulfate, and sodium perphosphate. These materials initiate vinyl chloride polymerization and produce terminal carboxyl, sulfate or phosphate groups in the process.

Preferred monomers containing polar groups include those selected from the group consisting of acrylic and methacrylic esters and amides, anhydrides, and styrenic monomers. Preferred polar groups are quaternary ammonium, sulfonate, phosphate and carboxyl. Certain combinations of these polar monomers are also advantageous, for example quaternary ammonium and phosphate. Methacryloxyethyl trimethyl ammonium chloride, methacryl oxyethyl acid phosphate, acrylamidopropyl sodium sulfonate, sodium styrene sulfonate, acrylic or methacrylic acid, maleic anhydride, and maleic acid are some particularly preferred vinyl comonomers. Examples of useful polar monomers include but are not limited to those selected from the group consisting of acrylic acid, methacrylic acid, vinyl sulfonic acid, styrene sulfonic acid, 2-acrylamido-2-methyl-l-propanesulfonic acid, dimethylaminoethyl methacrylate, maleic anhydride, phosphate ester of 2-hydroxyethyl methacrylate, methacryloxyethyl trimethylammonium chloride, salts thereof, and mixtures thereof.

Examples of polymer reactions to produce polar groups are:
 (i) reaction of succinic anhydride with hydroxyl groups on a vinyl chloride copolymer to produce pendant acid functionality and
 (ii) reaction of tertiary amines with epoxy groups on a vinyl chloride copolymer to produce quaternary amines.

Other types of monomers amenable to copolymerization include those selected from the group consisting of various kinds of vinyl esters such as vinyl acetate, vinylidene chloride, acrylonitrile, methacrylonitrile, styrene, acrylate and methacrylate esters such as methyl acrylate, ethyl acrylate, butyl acrylate, and butyl methacrylate and other unsaturated monomers such as vinyl ethers, acrylamide, methacrylamide, maleic anhydride, and mixtures thereof.

Some preferred vinyl chloride copolymer resins are described in U.S. Pat. No. 4,816,683, incorporated by reference herein (assigned to Sekisui Chemical). These are copolymers of vinyl chloride, hydroxypropyl acrylate, methacryloxyethyl trimethylammonium chloride, and methacryloxyethyl phosphate. These are thought to be similar to or the same as the commercially available "S-LEC E-C" resins (E-C130 and E-C110) made by Sekisui Chemical Co. According to information supplied by the vendor, these are approximately 84% vinyl chloride, 16% hydroxy acrylic monomer (by weight) and contain a fraction of a percent of other monomers, including a quaternary ammonium monomer.

Another preferred class of vinyl chloride copolymers are the sulfonated vinyl "MR" resins (MR-110, MR-113, MR-120, and others) commercially available from Nippon Zeon Co. Polymers of this type are described in U.S. Pat. Nos. 4,707,410 and 4,707,411 (assigned to Nippon Zeon), both incorporated by reference herein. A preferred resin approximate composition is as follows: 20,000 sulfonate equivalent weight, 2000 hydroxyl equivalent weight, and 5500 epoxy equivalent weight.

Another useful vinyl chloride copolymer is UCARMAG binder 528 from Union Carbide which contains carboxyl group (about 5600 g/mole) and hydroxyl groups (850 g/mole) and is described in U.S. Pat. No. 4,985,3 14, incorporated by reference herein.

Vinyl chloride copolymers containing no polar functionality can also be useful in some cases. An example is VAGH from Union Carbide which contains vinyl chloride and hydrolyzed vinyl acetate such that the hydroxyl equivalent weight is about 750 g/mole.

IV. Dispersion of Polymer or Polymer Blend for Use in Magnetic Media

The binder described herein can be used to prepare magnetic media such as tapes, e.g., video tapes, computer tape and data cartridge tape, and diskettes, both single-sided and double-sided.

A magnetic or magnetizable pigment can be readily dispersed within the polymeric binder of the invention, dispersion being facilitated by the incorporated acidic moiety. The preparation of a dispersion of magnetic pigment within the polymer or polymer blend of the present invention, is relatively straight-forward. A variety of pigments may be used, including but not limited to those selected from the group consisting of ferric oxides; gamma ferric oxide; cobalt doped gamma ferric oxides; chromium dioxide; iron; iron-cobalt; cobalt; nickel; cobalt-nickel; cobalt-phosphorus; barium ferrite; and mixtures thereof.

It is foreseen that a variety of loadings, densities, solvent systems, adjuvants, etc., may be utilized. The following conditions are typical, and were employed in preparation of some of the dispersions reported in the examples below (parts by weight unless otherwise noted) about 100 parts of pigment such as ($Co-_\gamma-Fe_2O_3$) having a surface area 50 $m^2/g$ and a powder coercivity of 950 Oersted; about 15 to 40 parts of binder (i.e., polymer or polymer blend); and about 150 to 400 parts of solvent are combined with about 750 parts of steel or glass milling media in a steel container and milled by agitation until the pigment is dispersed throughout.

The coated and dried dispersion of the present invention can be readily cured. Curing is a process in which crosslinking of the binder polymer takes place and which renders the resulting cured polyurethane polymer dimensionally stable and essentially insoluble in common organic solvents. One method of cure involves use of multi-functional isocyanate curing agents, the isocyanate groups of which may react with hydroxy groups which may be present on the polymer of the present invention. A curative is typically added after a dispersion comprising pigment, solvent, and binder is prepared. A typical curative comprises, for example, a triisocyanate such as the adduct of toluene diisocyanate with a mixture of polyols including, e.g., trimethylol propane. One such material is available under the trade designation MONDUR™ CB-601 from Mobay Chemical Company. Typical curatives are polyisocyante compounds, for example polyisocyanates such as MONDUR™ CB-601, MONDUR™ CB-75, MONDUR™ MRS (all available from Mobay Chemical Co.), DESMODUR™ (available from Bayer A.G.), and CORONATE™ (available from Nippon Polyurethane). Additional isocyanate curing agents are described in U.S. Pat. No. 4,731,292, incorporated by reference herein. The curative is preferably added in a proportion of about 1 to 20 weight percent based upon the binder weight. The binder weight refers to the weight of the polymer of the invention plus any optional binder such as vinyl chloride copolymer with which it is blended.

The resulting dispersion can be readily applied to a support such as a polyethylene terephthalate (PET) film using a knife coating method. Examples of supports on which the magnetic coating material can be applied include but are not limited to those selected from the group consisting of polyesters such as polyethylene terephthalate and polyethylene-2,6-naphthalate; polyolefins such as polyethylene and polypropylene; derivatives of cellulose such as cellulose triacetate, cellulose acetate butylate, cellulose acetate propionate; polycarbonate; polyvinyl chloride; polyimides; polyamides; metals such as aluminum and copper; and paper. Immediately after coating and while the solvent is still present and the binder is substantially uncured, the coated substrate typically is subject to a magnetic field to orient the magnetic particles. After coating and orienting, the substrate is dried of solvent and allowed to cure. The curing retains the pigment in the oriented manner. Curing can take place either at room temperature or at elevated temperatures (50°–60° C.).

Another method of cure involves irradiation of a polymeric binder containing radiation-curable moieties such as ethylenically-unsaturated groups. Irradiation of the coated and dried dispersion may be achieved using any type of ionizing radiation, e.g., electron beam radiation or ultraviolet radiation, in accordance with practices known in the art. Preferably, curing is achieved with an amount of electron beam radiation in the range of from about 1 to about 20 Mrads, preferably from about 4 to about 12 Mrads, and more preferably from about 5 to about 9 Mrads of electron beam radiation having an energy level in the range of from about 100 to about 400 keV, preferably from about 200 to about 250 keV. Although electron beam irradiation can occur under ambient conditions or in an inert atmosphere, it is preferred to use an inert atmosphere as a safety measure in order to keep ozone levels to a minimum and to increase the efficiency of curing. "Inert atmosphere" means an atmosphere comprising flue gas, nitrogen, or a noble gas and having an oxygen content of less than 500 parts per million (ppm). A preferred inert atmosphere is a nitrogen atmosphere having an oxygen content of less than about 75 ppm.

A variety of additives known to those skilled in the art can be incorporated into the dispersion of the present invention. The dispersion can further comprise additives selected from the group consisting of head-cleaning agents, lubricants, dispersants, and wetting agents. It is envisioned that lubricants such as those disclosed in U.S. Pat. Nos. 4,731,292 and 4,784,907, both incorporated by reference herein, could be added to obtain desired frictional and processing characteristics. Examples of useful lubricants include but are not limited to those selected from the group consisting of $C_{10}$ to $C_{22}$ fatty acids, $C_1$ to $C_{18}$ alkyl esters of fatty acids, and mixtures thereof. Other examples of useful lubricants include those selected from the group consisting of silicone compounds such as silicone oils, fluorochemical lubricants, fluorosilicones, and particulate lubricants such as powders of inorganic or plastic materials. Preferred lubricants include those selected from the group consisting of myristic acid, stearic acid, palmitic acid, and butyl and amyl esters thereof. Typically mixtures of lubricants are used, especially mixtures of fatty acids and fatty esters.

If the binder described herein is used as a back-coat for magnetic media, the back-coat can optionally further comprise non-magnetizable pigments, such as, for example, those selected from the group consisting of carbon black, graphite, aluminum oxide, titanium dioxide, zinc oxide, silica gel, calcium carbonate, barium sulfate, and mixtures thereof.

The dispersion may further comprise an effective amount of a suitable dispersing agent, preferably about 1 to about 10 weight percent based upon pigment weight in order to disperse the pigment. Suitable dispersants include but are not limited to those selected from the group consisting of lethicin and quaternary ammonium acetates or phosphates such as EMCOL™ acetate, a polypropylene oxide adduct of diethyl ethanolamine quarternized with ethylene oxide and acetic anhydride, having a number average molecular weight of about 2300, and EMCOL™ phosphate, a polypropylene oxide adduct of diethyl ethanolamine quarternized with ethylene oxide and phosphoric acid. Both are available from Witco Chemical Co. and are disclosed in U.S. Pat. No. 4,837,082 incorporated by reference herein.

The dispersion may further comprise about 1 to about 10 weight percent of a wetting agent based upon the weight of the pigment. Suitable wetting agents include but are not limited to those selected from the group consisting of phosphoric acid esters such as mono-phosphorylated propylene oxide adducts of glycerol, e.g., the reaction product of 1 mole of phosphorous oxychloride with the reaction product of 10–11 moles of propylene oxide and 1 mole of glycerine.

Examples of useful head cleaning agents include but are not limited to those disclosed in U.S. Pat. Nos. 4,784,914 and 4,731,292 both incorporated by reference herein. Examples of such head cleaning agents include but are not limited to those selected from the group consisting of alumina, chromium dioxide, alpha iron oxide, and titanium dioxide particles of a size less than about 2 microns which have a Mobs hardness of greater than about 5 and which are added in an amount ranging from about 0.2 to about 20 parts per hundred parts of magnetic pigment.

The detailed description includes exemplary preparations of the polymer blends in accordance with the invention and dispersions prepared therefrom. All parts, percentages, ratios, etc., throughout the Specification, including the Examples, are by weight unless otherwise indicated. In the following examples, the following agents are used:

TON™ 0210—a polycaprolactone diol produced by Union Carbide, number average molecular weight about 825, hydroxy equivalent weight about 415.

DURACARB™ 124—a polycarbonate diol, number average molecular weight about 2000, from PPG Industries, Inc.

Neopentyl glycol—a low molecular weight diol, number average molecular weight 104, hydroxy equivalent weight 52, additive for providing preferred characteristics.

TONE™ 0305—a polycaprolactone triol available from Union Carbide, number average molecular weight about 540, hydroxy equivalent weight about 180.

Diphenylmethane diisocyanate (MDI)—an isocyanate, number average molecular weight 250, isocyanate equivalent weight 125.

MONDUR™ CB-601—a triisocyanate available from Mobay Chemical Company. CB-601 is a toluene diisocyanate-based adduct of unspecified triols and diols which contains 10.4 percent NCO and is supplied as a 60 percent solution in ethylene glycol diacetate.

MEK—methyl ethyl ketone

Definition of Terms

Equivalent Weight

The term "equivalent weight" or "Eq. Wt.", as used herein with respect to a functionality or moiety, refers to the mass of polymer per mole, or equivalent, of functionality.

Squareness Ratio

The squareness ratio (Br/Bm), which is the ratio of the remnant saturation induction, or residual magnetization (Br), to the saturation induction, or saturation magnetization (Bin), refers to the effectiveness of the orientation of the magnetic particles in a dispersion. For randomly-oriented particles, the squareness ratio is 0.5 and for ideally and perfectly oriented particles, the ratio is equal to 1.0, thus the higher the value the better.

Inherent Viscosity

The inherent viscosity of each composition was measured to provide a comparison of the molecular weight of each composition. The inherent viscosity was measured by conventional means using a Wescan #50 viscometer in a water bath controlled at 25° C. to measure the flow time of 10 milliliters of a polymer solution (0.5 grams per deciliter of polymer in tetrahydrofuran solvent) and the flow time of the solvent. In each experiment, inherent viscosity is reported in deciliters per gram.

ICI Viscosity

The ICI viscosity of various magnetic media binder dispersions of the invention were measured on an ICI Rotating Cone and fixed plate viscometer from Research Equipment, Ltd. (London) which provided a measurement of viscosity in centipoise.

Smoothness

The smoothness of various magnetic media binder dispersions was determined by microscopic examination and refers to the substantial absence of any visible discrete particles. The dispersion uniformity was judged qualitatively.

Gloss

"Gloss" refers to the percentage of light incoming at 45° that is reflected at an observation angle of 45° measured via a Pacific Scientific Glossgard II 45° glossmeter.

Gn

Gn is a dimensionless measure of coercivity distribution given by the expression:

$$Gn=(Hc)/(\Delta Hc)$$

where $\Delta$ Hc is the width of the coercivity range at ½ peak height. Gn is the reciprocal of the switching field distribution.

TEST METHODS

Pigment Adsorption

Figure 1:
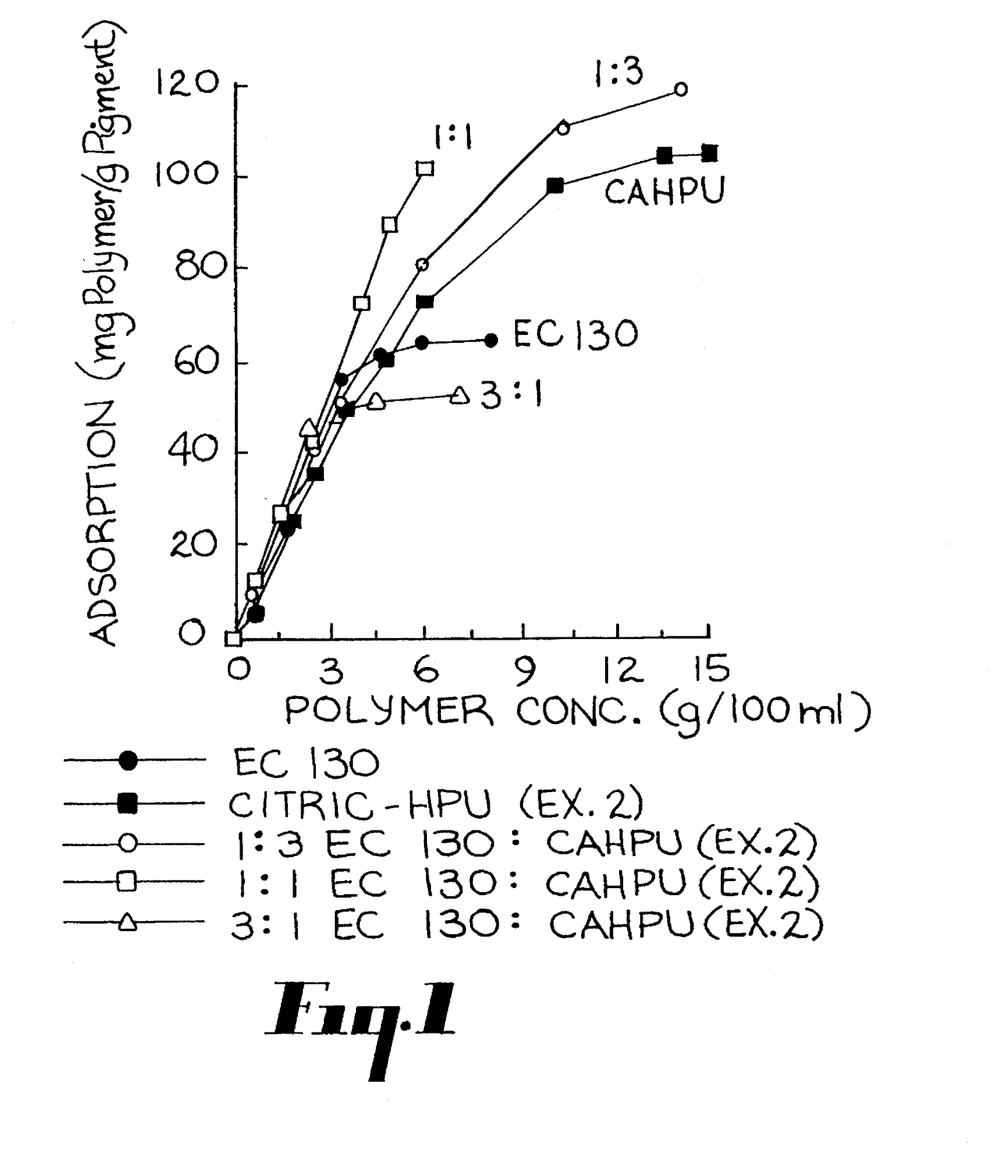
FIG. 1 illustrates the increased adsorption of citric acid-polyurethane adducts and their blends with E-C130 vinyl chloride-based resin (available from Sekisui) onto magnetic pigment.
Figure 2:
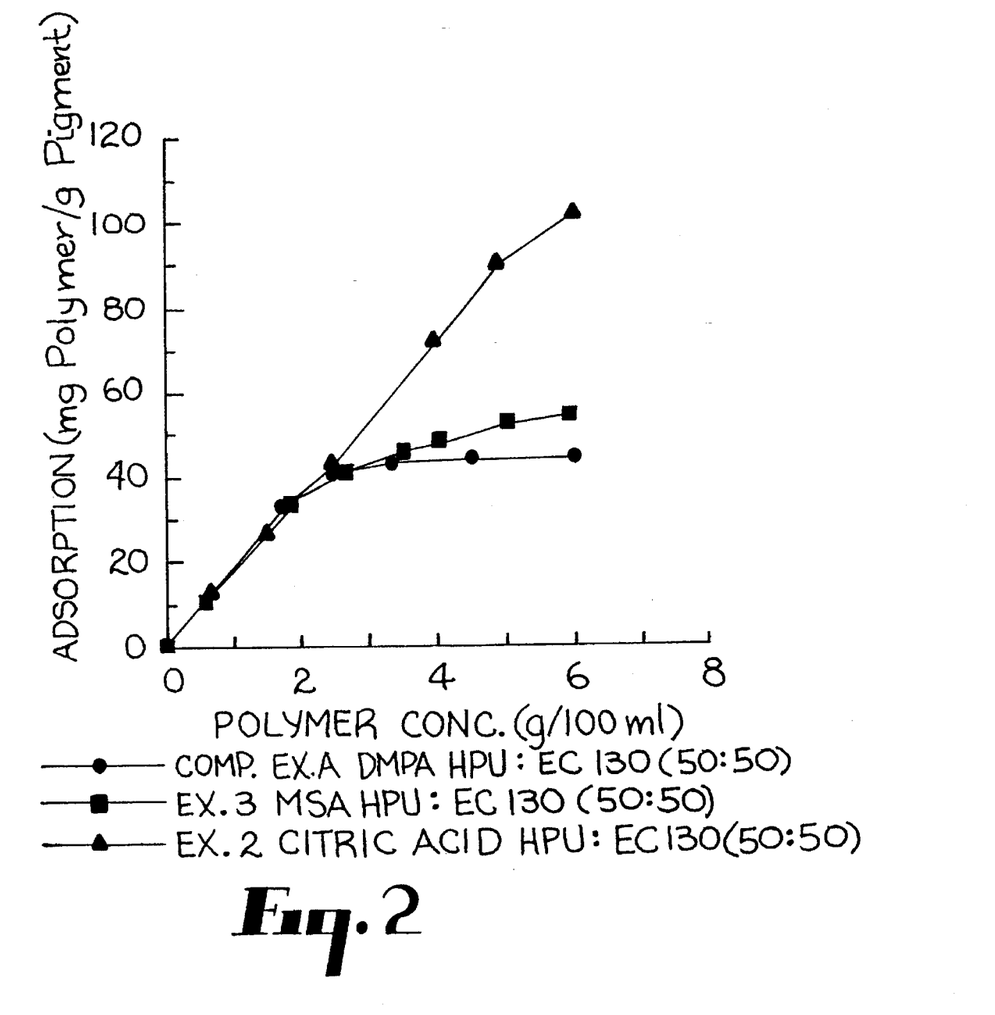
FIG. 2 illustrates the increased adsorption of both citric acid-polyurethane and mercaptosuccinic acid-polyurethane adducts relative to a known unidentate carboxylic acid-polyurethane adduct prepared using dimethylolpropionic acid (DMPA).

The degree of adsorption of polymers onto magnetic pigment was determined as follows: 10 grams of magnetic pigment were mixed with 15 grams of methyl ethyl ketone and with from 1 to 15 weight percent of polymeric binder based upon the weight of pigment in centrifuge-grade test tubes. The resultant slurries were agitated in an ultrasonic bath for one hour, then rolled for an additional 24 hours to ensure good mixing and attainment of equilibrium in the adsorption process. The test tubes were then centrifuged for 45 minutes and the polymer concentration in the supernatant liquid was analyzed by gravimetric means. The amount of polymer adsorbed on the pigment surface was calculated according to the following formula:

$$\text{Adsorbed amount (i.e., mg polymer/g pigment)} = Mo(Ci-Ce)$$

where
- Mo=total amount of polymer plus solvent per unit weight of pigment
- Ci=initial polymer weight fraction
- Ce=equilibrium polymer weight fraction Results for adsorption of polymers onto BaFe pigments are presented in FIGS. 1 and 2.

EXAMPLE 1

20,000 Equivalent Weight Citric Acid Polycarbonate Polyurethane

To a 1-liter flask were added 97.9 g DURACARB™ 124 polycarbonate diol (0.098 eq), 25.9 g neopentyl glycol (0.498 eq), 0.1 g dibutyltin dilaurate and 381 g MEK. Distillation of 50 g of MEK was followed by addition of 96.8 g diphenylmethane diisocyanate (0.775 eq). The solution was heated to reflux for 1 hour, after which 2.66 g citric acid (0.028 eq) were added, after which reflux continued for 1 hour. Then, 54.38 g (0.302 eq) TONE™ 0305 polycaprolactone triol and an additional 82 g MEK were added and reflux was continued for an additional 2 hours. Infrared spectroscopic analysis showed that all of the anhydride and all of the isocyanate had been consumed. The mixture showed an inherent viscosity of 0.32 dl/g. Citric acid equivalent weight was calculated at 20,000 g/eq, and the hydroxyl equivalent weight was calculated to be 1800 g/eq.

EXAMPLE 2

20,000 Equivalent Weight Citric Acid Polycaprolactone Polyurethane

The procedure of Example 1 was followed except that 48.8 g (0.115 eq) TONE™ 0210 polycaprolactone diol, 11.7 g neopentyl glycol, 0.1 g dibutyltin dilaurate, a total of 302 g MEK in charges of 223 g and 79 g, respectively, 57.87 g diphenylmethane diisocyanate (MDI) (0.463 eq), 1.6 g citric acid (0.016 eq), 42.73 g TONE™ 0305 polycaprolactone triol, and a final charge of 1.48 g MDI, were used. Final inherent viscosity=0.24 dl/g. Calculated citric acid equivalent weight=20,000. Calculated hydroxyl equivalent weight=1400.

EXAMPLE 3

20,000 Equivalent Weight Mercaptosuccinic Acid Polyurethane

The procedure of Example 1 was followed except that 7.5 kg TONE™ 0210 polycaprolactone diol (17.7 eq), 1.9 kg neopentyl glycol (36.7 eq), 10.2 g dibutyltin dilaurate, a total of 36 kg MEK in charges of 27 kg and 9 kg, 8.9 kg MDI (71.2 eq), 195.8 g mercaptosuccinic acid (1.5 eq), 6.6 kg TONE™ 0305 polycaprolactone triol (36.7 eq), and an additional final charge of 590 g MDI (4.72 eq), were used. Final inherent viscosity=0.28 dl/g. Calculated mercaptosuccinic acid equivalent weight=19,600. Calculated hydroxyl equivalent weight=1425.

Comparative Example A

20,000 Equivalent Weight Dimethylolpropionic Acid Polyurethane

The procedure of Example 1 was followed except that 48.8 g TONE™ 0210 polycaprolactone diol (0.115 eq), 11.7 g neopentyl glycol (0.225 eq), 0.1 g dibutyltin dilaurate, a total of 301 g MEK in charges of 222 g and 79 g, 57.86 g MDI (0.463 eq), 1.1 g dimethylolpropionic acid (0.016 eq), 42.73 g TONE™ 0305 polycaprolactone triol, and a final charge of 1.48 g MDI, were used. Final inherent viscosity=0.26 dl/g. Calculated dimethylolpropionic acid equivalent weight=20,000. Calculated hydroxyl equivalent weight=1400.

EXAMPLE 4

Methacrylate-Functional Mercaptosuccinic Acid Polyurethane

To prepare a methacrylate-functional polyurethane, 27.0 g (0.17 g) isocyanatoethyl methacrylate and a few drops of dibutyltin dilaurate were added to 600 g (0.17 eq) of a 43.6% solution of the mercaptosuccinic acid polyurethane of Example 3 in MEK in a 1-liter bottle. The bottle was sealed and the mixture was heated at 55° C. for 16 hours. On cooling to room temperature, infrared spectroscopic analysis of the reaction mixture showed no residual isocyanate. Calculated methacrylate equivalent weight=1650.

EXAMPLE 5

Allyl-Functional Mercaptosuccinic Acid Polyurethane

To a 2-liter flask were added 214 g TONE™ 0210 polycaprolactone diol (0.503 eq), 30.1 g neopentyl glycol (0.579 eq), 30 g 3-allyloxy-1,2-propanediol (0.454 eq; available from Aldrich Co.) and 862 g MEK. 75 g MEK were distilled off to dry the mixture. Then, 229.4 g diphenylmethane diisocyanate (1.835 eq) and 0.2 g dibutyltin dilaurate were added and the mixture was heated at reflux for two hours. The mixture was cooled to 50° C., after which 4.5 g mercaptosuccinic acid (0.03 eq), 86.2 g TONE™ 0305 polycaprolactone triol and 129 g MEK were added. The reaction mixture was heated at reflux for one hour, then 3 g diphenylmethane diisocyanate were added and reflux was continued for another two hours. Final inherent viscosity= 0.30 dl/g. Calculated hydroxyl equivalent weight=3000. Calculated mercaptosuccinic acid equivalent weight=20,000. Calculated allyloxy equivalent weight=2600.

EXAMPLES 6–9

Preparation of Dispersions

In order to prepare dispersions of magnetic pigment in binders of the invention, the ingredients as noted were separately introduced into a ball mill using steel media and dispersed therein for two hours. Each resulting dispersion was applied to a 100 micrometers thick polyethylene terephthalate film using a knife coater and the resulting coated films were allowed to stand in a parallel magnetic field of 1800 Gauss for about one second immediately after coating. On drying, the magnetic layers had thicknesses of about 4–5 micrometers. The viscosity of the dispersions, along with the squareness, 45° gloss, coercivity and output of the resulting magnetic tapes, are shown in Table I.

EXAMPLE 6

A dispersion of 100 parts barium ferrite pigment, 7.5 parts E-C130 vinyl chloride copolymer binder (available from Sekisui), 2 parts myristic acid, 1 part butyl stearate, 3 parts polyisocyanate (MONDUR™ CB-601, available from Mobay), and 7.5 parts of the citric acid polymer from Example 1 was prepared in 109 parts methyl ethyl ketone, 54 parts cyclohexanone and 18 parts toluene.

EXAMPLE 7

The procedure of Example 6 was followed except that the mercaptosuccinic acid polymer of Example 3 was substituted for the citric acid polymer of Example 1.

Comparative Example 8

The procedure of Example 6 was followed except that the dimethylol propionic acid polymer of Comparative Example A was substituted for the polymer of Example 1.

EXAMPLE 9

The procedure of Example 7 was followed except that the barium ferrite pigment was replaced by a cobalt-modified iron oxide pigment.

TABLE I

| Example | Br (Gauss) | Square-ness | Coercivity $H_c$ (Oe) | 45° Gloss | Viscosity 10000 sec$^{-1}$ |
|---|---|---|---|---|---|
| 6 | 1577 | 0.876 | 1486 | 69 | 43 |
| 7 | 1412 | 0.841 | 1505 | 69 | 25 |
| 8 | 1204 | 0.821 | 1496 | 46 | 25 |
| 9 | 1575 | 0.830 | 775 | N/A* | 37 |

*N/A = not available

As the data in Table I indicate, the dispersions of Examples 6 and 7, prepared with the polyurethane binders of the invention, exhibit improved electromagnetic properties over the binder of Comparative Example 8 prepared with a non-chelating polyurethane, as indicated by higher residual magnetization (Br) and higher squareness values. The higher 45° gloss values also indicate a high degree of interaction between the polymeric binders and the magnetic pigment, yielding a smoother coating. The binder of Example 9 is also shown to exhibit satisfactory electromagnetic properties using an iron oxide pigment.

EXAMPLE 10

10,000 Equivalent Weight Citric Acid Polycaprolactone Polyurethane

The procedure of Example 1 was followed except that 51.6 g (0.121 eq) TONE™ 0210 polycaprolactone diol, 10.8 g (0.208 eq) neopentyl glycol, 0.1 g dibutyltin dilaurate, 58.8 g (0.470 eq) diphenylmethane diisocyanate, 295 g MEK in charges of 236 and 59 g respectively, 3.1 g (0.016 eq) citric acid, 39.1 g (0.217 eq) TONE™ 0305 polycaprolactone triol were used. Final inherent viscosity=0.24 dl/g. Calculated citric acid equivalent weight=10,000, Calculated hydroxyl equivalent weight=1500.

EXAMPLE 11

5,00.0 Equivalent Weight Citric Acid Polycaprolactone Polyurethane

The procedure of Example 1 was followed except that 50.0 g (0.118 eq) TONE™ 0210 polycaprolactone diol, 13.7 g (0.264 eq) neopentyl glycol, 0.1 g dibutyltin dilaurate, 66.9 g (0.535 eq) diphenylmethane diisocyanate, 279 g MEK in charges of 196 and 73 g respectively, 5.8 g (0.03 eq) citric acid, 55.6 g (0.31 eq) TONE™ 0305 polycaprolactone triol were used. Final inherent viscosity=0.24 dl/g. Calculated citric acid equivalent weight=5,000. Calculated hydroxyl equivalent weight=1800.

EXAMPLE 12

Dispersions of 16 g barium ferrite pigment (ST 50125 from Toda Co., Hiroshima, Japan) and 2.6 g of the polymer or polymer blend indicated in Table II were prepared in a mixture of 7.5 g MEK, 2.5 g toluene and 2.5 g cyclohexanone with 250 g steel media in a steel milling container. The container was shaken on a paint shaker for a total of 2 hours (1 hour shaking, 1 hour cooling, 1 hour shaking, 1 hour cooling) whereupon the containers were opened and 9.8 g MEK, 3.3 g toluene, 3.3 g cyclohexanone and 0.8 g aluminum oxide head cleaning agent were added. After 15 minute additional shaking, the samples were cooled and coated to a thickness of about 3 mils. The gloss and magnetic performance results of each coating is shown in Table II. A gloss value greater than 30 and a value of Gn greater than about 2.0 is considered good for this pigment and higher values are better. This indicates that the polymers of the present invention are effective in dispersing pigment, and that the blends of the current invention show a surprising synergistic effect—blends were often more effective than either component used alone.

TABLE II

| Polymer | Citric Equivalent Weight | 45° Gloss | Gn |
|---|---|---|---|
| Example 11 | 5,000 | 65 | 2.26 |
| E-C130/Ex. 11 50/50 | 5,000 | 49 | 3.32 |
| E-C130/Ex. 10 50/50 | 10,000 | 48 | 2.95 |
| Example 10 | 10,000 | 39 | 2.04 |
| E-C130 | | 33 | 2.75 |
| E-C130/Ex. 2 50/50 | 20,000 | 31 | 2.48 |
| Example 2 | 20,000 | 14 | 1.79 |

EXAMPLE 13

Nitrilotriacetic Anhydride 20 g nitrilotriacetic acid (0.1.5 eq) was combined with 32.4 g acetic anhydride (0.317 eq) in 36 g dimethylacetamide solvent. The reaction was heated for 3 hours whereupon a clear amber solution was obtained. Volatiles were vacuum distilled leaving about 30 g of brown liquid which was diluted with 100 g MEK. The small amount of insolubles present were filtered and discarded. Most of the MEK was removed from the filtrate using a rotary evaporator leaving 22.2 g of a brown viscous liquid whose infrared spectrum was consistent with nitrilotriacetic anhydride.

EXAMPLE 14

10,000 Equivalent Weight Nitrilotriacetic Anhydride Polycaprolactone

Polyurethane

To a 1-liter flask were added 51.6 g (0.121 eq) TONE™ 0210 polycaprolactone diol, 10.8 g (0.208 eq) neopentyl glycol, 0.1 g dibutyltin dilaurate, and 182 g MEK. 56.1 g (0.45 eq) diphenylmethane diisocyanate was added and the mixture was heated for 1 hour at 75° C. 37.3 g (0.21 eq) TONE™ 0305 polycaprolactone triol was added followed by 2.8 g nitrilotriacetic anhydride of Example 13 and 56 g MEK. The mixture was held 3 hours at 75° C. whereupon the anhydride peaks at 1773 and 1824 $cm^{-1}$ in the infrared spectrum had disappeared. Calculated nitrilotriacetic acid equivalent weight=10,000. Calculated hydroxyl equivalent weight=1850.

EXAMPLE 15

Dispersions Made from 10,000 Equivalent Weight

Nitrilotriacetic Acid Polyurethane

A. A dispersion of 48 g barium ferrite pigment (S 50100 from Toda Co., Hiroshima, Japan) and 8.4 g of the polymer of Example 14 was prepared in a total of 84 g MEK and coated on a PET film following the procedure of Examples 6–9. Squareness and gloss results are shown in Table III.

B. A second dispersion containing 4.2 g of the polymer of Example 14 and 4.2 g E-C130 polymer was also prepared and coated on a PET film following the procedure of Example 15B. Squareness and gloss results are shown in Table III.

TABLE III

| Binder | Squareness | Gloss |
| --- | --- | --- |
| Example 14 | 0.67 | 4 |
| Example 14/E-C130 50/50 | .80 | 53 |

In the case of this difficult to disperse pigment, barium ferrite, the polyurethane of Example 14 was able to disperse the particles but flocculation occurred. The combination of the polyurethane of Example 14 with the vinyl chloride copolymer prevented flocculation and produced a good dispersion.

EXAMPLE 16

20,000 Equivalent Weight Malic Acid Polycaprolactone Polyurethane

The procedure of Example 1 was followed except that 55.9 g (0.132 eq) TONE™ 0210 polycaprolactone diol, 11.7 g (0.225 eq) neopentyl glycol, 0.1 g dibutyltin dilaurate, 59.3 g (0.475 eq) diphenylmethane diisocyanate, 251 g MEK in charges of 192 and 59 g respectively, 1.1 g (0.008 eq) malic acid, 39.4 g (0.219 eq) TONE™ 0305 polycaprolactone triol were used. Final inherent viscosity=0.26 dl/g. Calculated malic acid equivalent weight=20,000. Calculated hydroxyl equivalent weight=1800.

EXAMPLE 17

20,000 Equivalent Weight Tartaric Acid Polycaprolactone Polyurethane

The procedure of Example 1 was followed except that 55.9 g (0.132 eq) TONE™ 0210 polycaprolactone diol, 11.7 g (0.225 eq) neopentyl glycol, 0.1 g dibutyltin dilaurate, 59.3 g (0.475 eq) diphenylmethane diisocyanate, 251 g MEK in charges of 192 and 59 g respectively, 1.3 g (0.008 eq) D,L-tartaric acid, 39.4 g (0.219 eq) TONE™ 0305 polycaprolactone triol were used. Final inherent viscosity=0.29 dl/g. Calculated tartaric acid equivalent weight=20,000. Calculated hydroxyl equivalent weight=1800.

EXAMPLE 18

20,000 Equivalent Weight Dimercaptosuccinic Acid Polycaprolactone Polyurethane

The procedure of Example 1 was followed except that 56.5 g (0.138 eq) TONE™ 0210 polycaprolactone diol, 12.2 g (0.235 eq) neopentyl glycol, 0.1 g dibutyltin dilaurate, 62.0 g (0.496 eq) diphenylmethane diisocyanate, 264 g MEK in charges of 202 and 62 g respectively, 1.6 g (0.009 eq) 2,3-dimercaptosuccinic acid, 41.2 g (0.229 eq) TONE™ 0305 polycaprolactone triol were used. Final inherent viscosity=0.26 dl/g. Calculated dimercaptosuccinic acid equivalent weight=20,000. Calculated hydroxyl equivalent weight=1500.

EXAMPLES 19–21

Preparation of Dispersions

The following ingredients were separately introduced into a 0.5 liter stainless steel milling container and mixed and dispersed therein, for 5 hours at 1500 RPMS in order to form a dispersion: 81 g of iron oxide pigment ISk 9966 (available from Ishihara Sangyo Kaisha, Ltd., Tokyo), 192 g of methyl ethyl ketone, 600 g of steel media (1.3 mm diameter), and 27 g of the polymer of the invention.

The resulting dispersions were applied to films of a polyethylene terephthalate (thickness: 25 micrometers) by means of knife coating and the resulting coated films were allowed to stand in a parallel magnetic field of 1400 Oersted for about one second. The magnetic layers obtained had thicknesses of about 5 micrometers. The dispersions for preparing the tapes of the foregoing examples were evaluated for viscosity. The squareness ratio and gloss of the magnetic coatings of the tapes prepared in the foregoing examples were also measured. Smoothness (examined under a microscope) and dispersion viscosity, and squareness data is shown in Table IV.

TABLE IV

| Ex. | Binder | Dispersion Quality | Brookfield Viscosity cps | Squareness |
| --- | --- | --- | --- | --- |
| 19 | Ex. 16 | Smooth | 15000 at 52% solids | .77 |
| 20 | Ex. 17 | Smooth | 3750 at 36% solids | .69 |
| 21 | Ex. 18 | Smooth | 1840 at 36% solids | .75 |

The data in Table IV indicate that binders 16, 17, and 18 can provide dispersions which are smooth and can be oriented.

While this invention has been described in connection with specific embodiments, it should be understood that it is capable of further modification. The claims herein are intended to cover those variations which one skilled in the art would recognize as the chemical equivalent of what has been described herein.

What is claimed:

1. A carboxylic acid functional polyurethane polymer comprising the reaction product of:

(a) one or more polyisocyanates;

(b) one or more polyols;

(c) one or more compounds selected from the group consisting of cyclic dicarboxylic acid anhydrides bearing at least one additional polar group in addition to its polar anhydride group; said cyclic dicarboxylic acid anhydride represented by the formula

I wherein $R^1$, $R^2$, $R^3$, and $R^4$ are independently selected from the group consisting of —H, —OH, —COOM, —SO$_3$M, —SH, —CH$_2$COOM, —SCH$_2$COOM, —P(=O)(OM)$_2$, —OP(=O)(OM)$_2$, and —Y, wherein at least one of $R^1$, $R^2$, $R^3$, and $R^4$ comprises a moiety other than —H or —Y;

Y is selected from the group consisting of linear alkyl groups comprising from about 1 to about 10 carbon atoms, branched alkyl groups comprising from about 1 to about 10 carbon atoms, and aryl groups comprising from about 6 to about 10 carbon atoms;

M is a cation selected from the group consisting of alkali metal cations, , H⁺ and ammonium cations;

$R^1$ and $R^2$ together or $R^3$ and $R^4$ together can optionally comprise =CHCOOH;

X is a divalent moiety independently selected from the group consisting of n represents an integer selected from the group consisting of 0 and 1;

$R^5$ and $R^6$ are independently selected from the group consisting of —H, —OH, —COOM, —SO₃M, —SH, —CH₂COOM, —SCH₂COOM, —P(=O)(OM)₂, —OP(=O)(OM)₂, and —Y, wherein M and Y are as defined above; and $R^7$ is a monovalent moiety independently selected from the group consisting of —CH₂COOH, —CH₂CH₂COOH, —CH₂CH₂N(CH₂COOH)₂, —(CH₂)₆N(CH₂COOH)₂, —(CH₂CH₂O)₂CH₂CH₂N(CH₂COOH)₂, and —CH₂CH₂N(CH₂COOH)CH₂CH₂OH;

and mixtures thereof;

wherein the ratio of polyisocyanate to polyol is typically such that the resulting polyurethane is not crosslinked and the ratio of —NCO groups to —OH group is less than about 1:1.

2. A polyurethane polymer having pendant therefrom at least one group of formula II wherein $R^1$, $R^2$, $R^3$, and $R^4$, are independently selected from the group consisting of —H, —OH, —COOM, —SO₃M, —SH, —CH₂COOM, —SCH₂COOM, —P(=O)(OM)₂, —OP(=O)(OM)₂, and —Y, wherein at least one of $R^1$, $R^2$, $R^3$, and $R^4$ comprises a moiety other than —H or —Y;

Y is selected from the group consisting of linear alkyl groups comprising from about 1 to about 10 carbon atoms, branched alkyl groups comprising from about 1 to about 10 carbon atoms, and aryl groups comprising from about 6 to about 10 carbon atoms;

M is a cation selected from the group consisting of alkali metal cations, H⁺, and ammonium cations;

$R^1$ and $R^2$ together or $R^3$ and $R^4$ together can optionally comprise =CHCOOH;

X is a divalent moiety independently selected from the group consisting of n represents an integer selected from the group consisting of 0 and 1;

$R^5$ and $R^6$ are independently selected from the group consisting of —H, —OH, —COOM, —SO₃M, —SH, —CH₂COOM, —SCH₂COOM, —P(=O)(OM)₂ —OP(=O)(OM)₂, and —Y, wherein M and Y are as defined above, and $R^7$ is a monovalent moiety independently selected from the group consisting of —CH₂COOH, —CH₂CH₂COOH, —CH₂CH₂N(CH₂COOH)₂, —(CH₂)₆N(CH₂COOH)₂, —(CH₂CH₂O)₂CH₂CH₂N(CH₂COOH)₂, and —CH₂CH₂N( CH₂COOH)CH₂CH₂OH.

3. A carboxylic acid-functional polyurethane polymer comprising:

a plurality of —COOH groups pendant from a polyurethane polymer backbone, wherein the polyurethane polymer has an —COOH equivalent weight of from about 1,000 to about 100,000;

wherein said carboxylic acid-functional polyurethane polymer is obtained by the condensation reaction(s) of a hydroxyl group(s) pendant from said polyurethane polymer backbone with an aliphatic polar-group substituted dicarboxylic acid anhydride selected from the group consisting of anhydrides represented by formula I(a), wherein for formula I(a) one of the following is true:

(i) $R^1$ is selected from the group consisting of —OH, —COOH, —SO₃H, —SH, —CH₂COOH, —SCH₂COOH, —CH(COOH)CH₂COOH, and —CHOHCH₂COOH and $R^2=R^3=R^4$=H;

(ii) $R^1=R^3$=—SH and $R^2=R^4$=—H;

(iii) $R^1$=CH₂COOH, $R^2$ is selected from the group consisting of CH₃ and OH, and $R^3=R^4$=H;

(iv) $R^1$ and $R^2$ together comprise=CHCOOH and $R^3=R^4$= —H;

(v) $R^3$ and $R^4$ together comprise=CHCOOH and $R^1=R^2$= —H; and by formula I(b)

wherein $R^5$ is selected from the group consisting of —CH₂COOH, —CH₂CH₂COOH, —CH₂CH₂N(CH₂COOH)₂, —(CH₂)₆N(CH₂COOH)₂, (CH₂CH₂O)₂CH₂CH₂N(CH₂COOH)₂, —CH₂CH₂N(CH₂COOH)CH₂CH₂OH, and mixtures of anhydrides of formulas I(a) and I(b).

4. The polymer of claim 1 wherein said polymer has a linear structure.

5. The polymer of claim 1 wherein said polymer has a branched structure.

6. The polymer of claim 1 wherein the —COOH group equivalent weight of the polymer ranges from about 2000 to about 30,000.

7. The polymer of claim 1 wherein:
   (i) the —COOH group equivalent weight of the polymer ranges from about 2000 to about 30,000; and
   (ii) the hydroxy equivalent weight of the polymer ranges from about 1000 to about 10,000.

8. The carboxylic acid-functional polyurethane polymer of claim 1 which further comprises a plurality of cross-linkable hydroxy groups, wherein the polyurethane polymer has a hydroxy equivalent weight of from about 500 to about 10,000.

9. The polyurethane polymer of claim 1 wherein said polyurethane polymer further comprises one or more radiation-curable moieties.

10. The polyurethane polymer of claim 9 wherein the radiation curable moieties are (meth)acrylate moieties.

11. The polyurethane polymer of claim 9 wherein the radiation curable moieties are allyl moieties.

12. A method of preparing a carboxylic acid functional polyurethane polymer comprising the steps of:

(a) forming a reaction product comprising a polyurethane prepolymer having a pendant isocyanate group(s) by reacting a molar excess of a polyisocyanate with one or more diols;

(b) forming a cyclic anhydride by reacting a dicarboxylic acid selected from the group consisting of 1,4-dicarboxylic acid bearing at least one polar group in addition to its two carboxylic acid groups, 1,5-dicarboxylic acid bearing at least one polar group in addition to its two carboxylic acid groups, and mixtures thereof with the reaction product of step (a) wherein the amount of polar group-containing dicarboxylic acid used is such that the ratio of moles of polar group-containing dicarboxylic acid to the moles of residual isocyanate groups in the reaction product of step (a) is less than about 0.25:1;

(c) forming a hydroxyl functional polyurethane polymer by converting the residual isocyanate groups of the prepolymer of step (a) which remain unreacted in step (b) to polyurethane via reaction with an excess of a polyol wherein the number of moles of hydroxyl groups contained therein is greater than the difference between the number of moles of residual isocyanate groups in the prepolymer of step (a) and the number of moles of polar group-containing dicarboxylic acid of step (b) and (d) allowing the reaction of the cyclic anhydride formed in step (b) with the hydroxyl functional polyurethane polymer thereby esterifying the hydroxyl groups with the cyclic anhydride and producing pendant polar-group functional carboxyl substituents on a polyurethane backbone.

* * * * *

UNITED STATES PATENT AND TRADEMARK OFFICE
CERTIFICATE OF CORRECTION

PATENT NO.: 5,498,685

DATED: March 12, 1996

INVENTOR(S): James G. Carlson et al.

It is certified that error appears in the above-identified patent and that said Letters Patent is hereby corrected as shown below:

On the Cover Page, under References Cited, U.S. Patent Documents, please add the following:

| | | |
|---|---|---|
| 4,096,127 | 6/1978 | Schurmann et al. |
| 4,571,364 | 2/1986 | Kasuga et al. |
| 4,612,244 | 9/1986 | Kameda et al. |
| 4,613,545 | 9/1986 | Chubachi et al. |
| 4,693,930 | 9/1987 | Kuo et al. |
| 4,788,103 | 11/1988 | Okita et al. |
| 5,026,860 | 6/1991 | Buchan et al. |
| 5,066,539 | 11/1991 | Inone et al. |
| 5,071,578 | 12/1991 | Ohkubo |
| 5,085,941 | 2/1992 | Ohkubo |

On the Cover Page, under References Cited, please add the following:

--Foreign Patent Documents

JP 03 64 310 3/1991

JP 03 64 314 3/1991--

UNITED STATES PATENT AND TRADEMARK OFFICE
CERTIFICATE OF CORRECTION

PATENT NO.: 5,498,685

DATED: March 12, 1996

INVENTOR(S): James G. Carlson et al.

It is certified that error appears in the above-identified patent and that said Letters Patent is hereby corrected as shown below:

Col. 11, line 3, "rivalent" should be --divalent--.

Col. 16, line 59, "Mobs" should be --Mohs--.

Col. 17, line 1, "TON™" should be --TONE™--.

Col. 17, line 19, "triols" should be --triols--.

Col. 17, line 36, "(Bin)," should be --(Bm),--.

Col. 21, line 39, "5,00.0" should be --5,000--.

Col. 26, line 45, "$R^2=R^3=R^4=H;$" should be --$R^2=R^3=R^4=$ -H;--.

Col. 26, line 65, "$(CH_2CH_2O)_2CH_2CH_2N(CH_2COOH)_2,$" should be -- -$(CH_2CH_2O)_2CH_2CH_2N(CH_2COOH)_2,$--.

Col. 28, line 1, delete the dash between "anhydride" and "by".

Signed and Sealed this

Twenty-seventh Day of August, 1996

Attest:

BRUCE LEHMAN

Attesting Officer      Commissioner of Patents and Trademarks